(12) United States Patent
Akesson

(10) Patent No.: US 8,579,201 B2
(45) Date of Patent: Nov. 12, 2013

(54) HYBRID CARD

(75) Inventor: Peo Akesson, Boulder, CO (US)

(73) Assignee: Sustainable Cards, LLC, Boulder, CO (US)

( * ) Notice: Subject to any disclaimer, the term of this patent is extended or adjusted under 35 U.S.C. 154(b) by 277 days.

(21) Appl. No.: 12/686,006

(22) Filed: Jan. 12, 2010

(65) Prior Publication Data

US 2011/0168781 A1    Jul. 14, 2011

(51) Int. Cl.
*G06K 19/06* (2006.01)

(52) U.S. Cl.
USPC .......................... 235/492; 235/487; 235/493

(58) Field of Classification Search
USPC ......................................... 235/487, 493, 492
See application file for complete search history.

(56) References Cited

U.S. PATENT DOCUMENTS

| | | |
|---|---|---|
| D43,028 S | 9/1912 | Sonn |
| D115,062 S | 6/1938 | Brehm |
| D205,025 S | 6/1966 | Watts |
| 3,412,493 A | 11/1968 | French |
| 3,415,708 A | 12/1968 | Rondum |
| 3,452,861 A | 7/1969 | Erwin |
| 3,663,353 A | 5/1972 | Long et al. |
| 3,666,593 A | 5/1972 | Lee |
| 3,732,640 A | 5/1973 | Changnon |
| 3,738,900 A | 6/1973 | Matzke |
| D234,927 S | 4/1975 | Putt |
| D240,523 S | 7/1976 | Box |
| 3,969,558 A | 7/1976 | Sadashige |
| D263,724 S | 4/1982 | Laughlin |
| 4,417,413 A | 11/1983 | Hoppe et al. |
| D274,535 S | 7/1984 | Hicks |
| D302,177 S | 7/1989 | Evenson |
| D310,241 S | 8/1990 | Evenson |
| 5,194,310 A | 3/1993 | Lenderink |
| D359,029 S | 6/1995 | Bolles |
| D387,304 S | 12/1997 | Alcala |
| 5,953,001 A | 9/1999 | Challener et al. |

(Continued)

FOREIGN PATENT DOCUMENTS

| | | |
|---|---|---|
| DE | 20014560 U1 | 11/2000 |
| EP | 629975 | 12/1994 |

(Continued)

OTHER PUBLICATIONS

Patent Cooperation Treaty (PCT) Written Opinion of the International Searching Authority. International application No. PCT/SE2010/050783. Date of completion of this opinion: Oct. 22, 2010.

(Continued)

*Primary Examiner* — Michael G Lee
*Assistant Examiner* — Tabitha Chedekel
(74) *Attorney, Agent, or Firm* — Mollborn Patents, Inc.; Fredrik Mollborn

(57) ABSTRACT

A hybrid card is described. The hybrid card includes an organic substrate, a first layer of a substantially organic backer that is securely affixed to a first side of the substrate, a second layer of a substantially organic backer that is securely affixed to an opposite side of the substrate, a first layer of thin-film overlay that is attached to the first layer of backer, a second layer of thin-film overlay that is attached to the second layer of backer. Manufacturing methods for the various embodiments of the hybrid card are also described.

34 Claims, 3 Drawing Sheets

(56) References Cited

U.S. PATENT DOCUMENTS

| | | | |
|---|---|---|---|
| 6,103,333 | A | 8/2000 | Keith |
| D436,991 | S | 1/2001 | Morgante |
| 6,186,398 | B1 | 2/2001 | Kato et al. |
| 6,217,405 | B1 | 4/2001 | Burrows |
| D446,825 | S | 8/2001 | Gabrielsen |
| D457,556 | S | 5/2002 | Hochschild |
| 6,419,543 | B1 | 7/2002 | Burrows |
| D466,437 | S | 12/2002 | Lai |
| 6,522,549 | B2 | 2/2003 | Kano |
| 6,547,626 | B1 | 4/2003 | Burrows |
| 6,561,657 | B1 | 5/2003 | Schofield |
| 6,649,245 | B2 | 11/2003 | Lenderink |
| D491,319 | S | 6/2004 | Wright et al. |
| D493,101 | S | 7/2004 | Dougherty et al. |
| D505,450 | S | 5/2005 | Lauer et al. |
| D506,340 | S | 6/2005 | Brandon |
| D573,182 | S | 7/2008 | Ricketts et al. |
| D632,735 | S | 2/2011 | McGrane et al. |
| 2002/0061389 | A1 | 5/2002 | Brooker et al. |
| 2002/0142145 | A1 | 10/2002 | Lenderink |
| 2002/0180206 | A1 | 12/2002 | Tronrud |
| 2003/0108664 | A1* | 6/2003 | Kodas et al. ............... 427/125 |
| 2004/0029030 | A1* | 2/2004 | Murray ........................ 430/130 |
| 2005/0051633 | A1* | 3/2005 | Lasch et al. ................. 235/487 |
| 2008/0003394 | A1 | 1/2008 | Eke |
| 2008/0020200 | A1 | 1/2008 | Stokes et al. |
| 2009/0008142 | A1* | 1/2009 | Shimizu et al. ............. 174/261 |
| 2009/0008462 | A1 | 1/2009 | Jensen et al. |
| 2009/0184168 | A1* | 7/2009 | Ricketts et al. ............. 235/492 |
| 2010/0078489 | A1* | 4/2010 | Winkler ...................... 235/493 |

FOREIGN PATENT DOCUMENTS

| | | |
|---|---|---|
| EP | 1090747 A1 | 4/2001 |
| JP | 1152094 | 6/1989 |
| WO | 9623276 | 8/1996 |
| WO | 0048121 A1 | 8/2000 |

OTHER PUBLICATIONS

Patent Cooperation Treaty (PCT) International Search Report. International application No. PCT/SE2010/050783. Date of the actual completion of the international search: Oct. 22, 2010.

* cited by examiner

HYBRID CARD

CROSS-REFERENCE TO RELATED APPLICATIONS

This application is related to U.S. patent application Ser. No. 12/500,276, filed on Jul. 9, 2009, and entitled "Decomposable Information Carrier." The content of this application is incorporated herein by reference in its entirety.

BACKGROUND

The various embodiments described herein relate to information carriers, such as credit cards, key cards, gift cards, and the like. Information carriers often come in the shape of cards that can be used in multiple applications. One example of such cards is so-called stored value cards or pre-paid cards, that is, gift cards, which have a pre-loaded monetary value that can be used for financial transactions. Other examples include credit and debit cards, which contain information that is coupled to a particular individual and to an account associated with an individual or some kind of organization, such as a business. Yet other examples include key cards or access cards, such as hotel key cards or building access cards, which contain information that allows the holder of the card to enter a particular room or building, and so on. Cards can also be used for a variety of other purposes, such as membership cards, medical insurance cards, phone cards, badges, identification cards, business cards, season passes, and so on.

The information contained on the card can be contained in a magnet strip or smart chip embedded in the card or as a barcode printed on the card, or in any other form that allows the card to be read by an electronic or optical reader. Recently, radio frequency identifier (RFID) transmitters have also been embedded into cards, such that the information on the card can be read by an RFID reader without requiring the holder of the card to slide the card through an electronic or optical reader.

Typically, these various types of cards are made of plastic, such as PVC (PolyVinyl Chloride). One problem with these types of cards is that the plastics from which they are made, for example, PVC, has a very low biodegradability. PVC has also been linked to many environmental and health concerns and its use is discouraged in many countries. Due to the widespread use and acceptance of these plastic information carriers, such as gift cards, hotel key cards, membership cards, etc. in our society, the environmental impact becomes significant as over 24,000 tons of plastic waste end up in landfills each year in North America alone. To put such number in perspective, it represents 97 Boeing 777-200 aircrafts being thrown away each year. These cards typically require about 500 years to break down. Some alternative solutions have been proposed, such as PLA (Polyactic Acid) or Bio-PVC cards, but recently, the general public has started questioning the environmental friendliness of these products due to the process required to manufacture these or the chemicals or additives needed to make the product usable.

SUMMARY

In general, in one aspect, the invention provides methods and apparatus, for providing a hybrid card. The hybrid card includes an organic substrate, a first layer of a substantially organic backer that is securely affixed to a first side of the substrate, a second layer of a substantially organic backer that is securely affixed to an opposite side of the substrate, a first layer of thin-film overlay that is attached to the first layer of backer and a second layer of thin-film overlay that is attached to the second layer of backer.

Various embodiments can include one or more of the following features. The first layer of backer and the second layer of backer can be made of the same material. The first layer of thin-film overlay and the second layer of thin-film overlay can be made of the same material. The organic substrate can be made of wood and the first and second layers of backer can be made of a long fibrous cellulose material. The wood can be birch, pine, ash, beech, spruce or aspen. The first and second layers of backer can be affixed to the substrate by means of an adhesive pre-applied to the first and second layers of backer. The first and second layers of backer can include admixed synthetic fibers and a latex binder. The total thickness of the card can be approximately 0.76 mm. The first and second layers of thin-film can be made of Poly Vinyl Chloride, Bio-Poly Vinyl Chloride, Polythylene Terephthalate or Polyactic Acid. The hybrid card can have an account identifier securely affixed to the card which links the card to a financial account, which account identifier is machine readable by a point-of-sale terminal. The account identifier can include a bar code, a magnetic strip, a smartchip, or a radio frequency identification (RFID) device. The card can include indicia identifying the type and use of the card. The card can be used as a credit card, a debit card, a key card, a stored value card, a pre-paid card, a gift card, an access card, a membership card, a medical insurance card, a phone card, a badge, an identification card, or a business card.

In general, in one aspect, the invention provides methods for making a hybrid card. A providing planar sheet of an organic substrate is provided. A first sheet of substantially organic backer is affixed to a first side of the substrate. A second sheet of substantially organic backer is affixed to a second side of the substrate, opposite to the first side. A first thin-film overlay is applied to the first sheet of backer. A second thin-film overlay is applied to the second sheet of backer, whereby the organic substrate, the first and second sheets of substantially organic backer, and the first and second thin-film overlays form a sheet assembly. One or more cards are cut from the sheet assembly.

Various embodiments can include one or more of the following features. The substrate can be made of wood veneer and the first and second sheets of backer can be made of a long fibrous cellulose material. Affixing the first sheet and affixing the second sheet to the substrate can include the following steps: applying an adhesive to one or more of the first sheet of backer, the second sheet of backer, and the substrate; placing the first sheet of backer on the first side of the substrate and the second sheet of backer on the second side of the substrate; and applying heat and pressure to the first sheet of backer, the second sheet of backer, and the substrate to cause the adhesive to form a bond between the substrate and the first and second sheets of backer.

The heat can be in the range of approximately 100 to 150 degrees Celsius, and the pressure can be in the range of approximately 10 to 30 kg/cm2. The first and second sheets of backer can further include a combination of synthetic fibers and a latex binder. One or more of a bar code, a magnetic strip, a smartchip, and a radio frequency identification (RFID) device can be added to the card. Text or indicia can be printed on the card. The substrate and affixed first and second backers can be flexed prior to applying the first and second layers of thin-film. The first and second thin-film overlays can be made of Poly Vinyl Chloride, Bio-Poly Vinyl Chloride, Polythylene Terephthalate or Polyactic Acid. The organic substrate can be made of wood veneer and the first and second sheets of backer can be made of a long fibrous cellulose material.

The various embodiments can include one or more of the following advantages. An environmentally friendly alternative to conventional plastic cards is provided, which includes mostly organic matter and can be degraded through one or more of UV-radiation, composting, aerobic degradation or anaerobic degradation (i.e, the card decomposes). The decomposability of the card reduces harmful landfill waste. The card has similar features to conventional plastic cards in terms of strength and flexibility. The card can be equipped with the same types of information carrying features as conventional plastic cards, such as magnet strips, bar codes, RFID transmitters, smartchips, images, text, and so on. The card does not have to be used as a stored value card or a carrier of secure information; it can be used for purposes such as business cards, bag tags, badges, and so on, as was discussed above. Furthermore, the card can have any size or shape that is appropriate for its use, and can be provided with any type of print or graphical design that conventional cards can have. The card is also in compliance with most of the significant ISO standards pertaining to cards, such as the ISO-7810 standard.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various embodiments of the invention relate to cards, such as hotel keys, credit and debit cards, gift cards (which are often referred to as stored value cards or pre-paid cards), and so on that are composed of environmentally friendly materials, while maintaining structural properties that are similar to conventional cards manufactured from plastic. The cards will be described below by way of example with reference to a generic credit card, but as the skilled person realizes, the techniques described herein can be applied to cards that can be used for a variety of purposes. Furthermore, the size and shape of the card can vary and is not limited to cards having a substantially rectangular shape.

Figure 1:
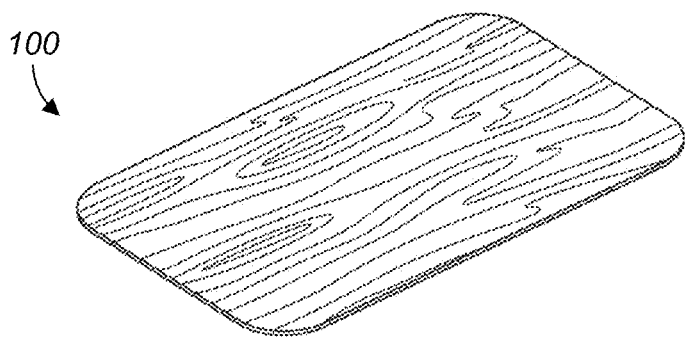
FIG. 1 shows a schematic perspective view of a card, in accordance with one embodiment of the invention.

FIG. 1 shows a schematic perspective view of a card (100), in accordance with one embodiment of the invention. The card illustrated in FIG. 1 is a plain card that is composed of a wood veneer substrate, sandwiched between two essentially transparent backers made from long-fibrous cellulose. The outermost layer on either side is made from a thin-film plastic, which protects the backers on either side and creates a smooth surface. These components will be described in further detail below. As a result it is possible to see the alignment, texture and appearance of the wood grain through the cellulose backer and plastic film. In some embodiments, the card (100) can have a simple, plain appearance, as shown in FIG. 1. In other embodiments, the card (100) can be provided with various types of indicia, as will now be described with reference to FIGS. 2 and 3.

Figure 2:
FIG. 2 shows a front view of a card, in accordance with one embodiment of the invention.

FIG. 2 shows a front view of a card (200), in accordance with one embodiment of the invention. As can be seen in FIG. 2, it is still possible to see the alignment, texture and appearance of the wood fibers on the parts of the card (200) that are not covered with the indicia. The indicia can be printed on the card, using various printing techniques, such as water and waterless offset printing, screen printing, ink jet printing or laser printing, just to mention a few techniques. Other types of printing include retransfer printing (for example, as used by Artemis Solutions Group of Freeland, Wash.), thermal transfer printing (for example, a described in http://en.wikipedia.org/wiki/Thermal_transfer_printer), drop on demand ink jet printing (for example, as used by Matthew's Marking Products of Pittsburgh, Pa.) and CO2 laser engraving (for example, a described in http://en.wikipedia.org/wiki/Laser_engraving). All these printing techniques ought to be familiar to people having ordinary skill in the printing art.

It should also be noted, that depending on the printing technique that is used, in some cases the alignment, texture and appearance of the wood fibers can be partly visible through the indicia on the card (200). On the card (200) shown in FIG. 2, the indicia include, for example, a bank logo, a credit card company logo, and a company logo. Other types of indicia can allow the card to be associated with a product, a brand, a store, a hotel, a holiday, a season, an occasion, a media format, e.g. characters, logos, scenes, or other illustrations or photographs related to at least one of a artist/performer, music, movie, television show, book, video game, and so on. The card (200) also includes at least one of the following identifiers; an account number, dates of validity, name of the card holder, and so on, just like conventional credit cards.

Figure 3:
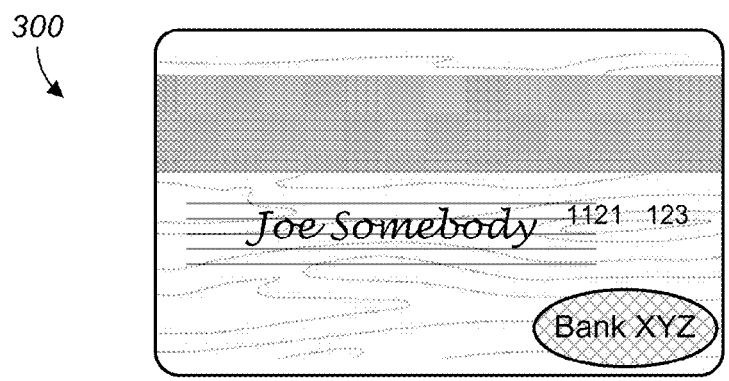
FIG. 3 shows a back view of a card, in accordance with one embodiment of the invention.

FIG. 3 shows a back view of a card (300), in accordance with one embodiment of the invention. Again, similar to conventional credit cards, the card (300) includes a magnet strip with account information, the signature of the holder of the card, security codes, bank information, and so on. In some alternative embodiments, there can be various other information, encoded by, for example, bar codes or as numbers concealed by a "scratch off" layer, which often is used in various types of gift cards, and so on. Also here, the degree of visibility of the alignment, texture and appearance of the wood fibers and the various indicia may vary. Next, the structure of an exemplary embodiment of the card will be explained in further detail with reference to FIGS. 4-5.

Figure 4:
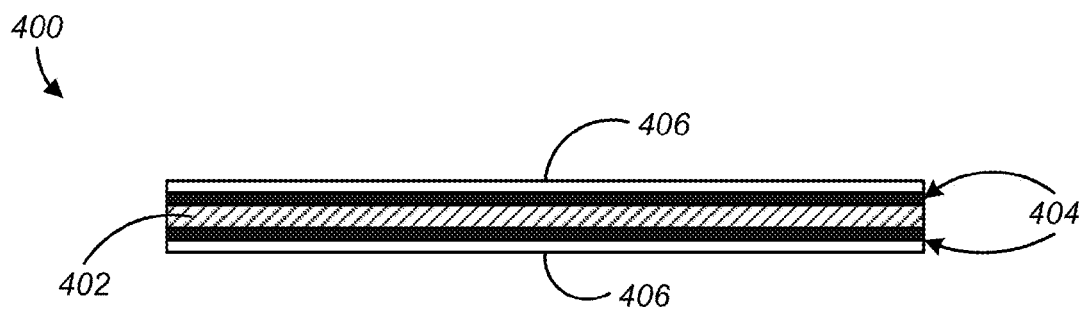
FIG. 4 shows a side view of a hybrid card, in accordance with one embodiment of the invention.

FIG. 4 shows a side view of a hybrid card (400), in accordance with one embodiment. The card (400) includes a main substrate (402) made of thin wood veneer, which is laminated with a transparent backer (404) made from long-fibrous cellulose on either side of the main substrate (402). Attached to the backer is a thin-film plastic layer (406). The combination of wood veneer, cellulose backer, and thin-film plastic improves the strength and flexibility of the card (400), making it comparable to conventional cards made of PVC or similar materials. The thickness of the substrate (402) is approximately 0.50-0.75 mm and the thickness of the cellulose backer (404) is approximately 0.01-0.20 mm, and the thickness of the plastic film layer is approximately 0.05-0.20 mm, thus resulting in a card (400) with a total thickness of approximately 0.76 mm or 0.03 in (which conforms to ISO standards) that can be used in any conventional application where plastic cards are used today.

Essentially any type of wood species that can be used to make veneer is suitable for use as the main substrate (402). Some examples of wood species that are particularly good include birch, pine, ash, beech, spruce, aspen, and so on. The major limiting factor for wood selection is the composition of the texture, alignment and appearance of the wood fibers, as this may in some applications affect the quality of the printing. In order to further reduce the environmental impact of the cards, the wood can preferably be obtained from so-called "sustainably managed forests," that is, forests that are managed based on environmentally, socially beneficial and economically viable management for present and future generations. Such forests are generally certified by some organization, such as the PEFC (Programme for the Endorsement of Forest Certification Methods), or the FSC (Forest Stewardship Council).

As was described above, in one embodiment the backer (404) is made of long-fibrous cellulose. In one embodiment, the backer (404) is made of about 80% cellulose, with admixed synthetic fibers and a latex binder (or other adhesive with substantially the same properties) to bond the cellulose and synthetic fibers, thereby increasing the tearing resistance of the backer (404). Different embodiments of the cellulose backer (404) can have varying degrees of transparency, from essentially opaque to essentially transparent. Typically the degree of transparency is in the range of about 80-90%, such that the structure of the main substrate (402) can be seen through the cellulose backer (404). One example of such a cellulose backer (404) is available from PWG VeneerBackings GmbH of Walkertshofen, Germany, which produces several types of cellulose backers (404) that may be suitable for application in this context.

The adhesive that is used for laminating the backer (404) to the main substrate (402) can be pre-applied to the cellulose backer (404). In one embodiment the adhesive is a dried dispersion of Polyvinylacetate (PVAC). It is important to note that the formaldehyde content in this composition is far below any limits imposed by various organizations, thus minimizing any adverse environmental impact. It should also be realized that this is merely one example. Any type of environmentally friendly adhesive in minimum amounts and which fulfills required environmental standards can be used, and many such variations can be envisioned by those of ordinary skill in the art.

The thin-film overlay (406) creates a durable and smooth coating. The thin-film can be made from many different substances, such as, PVC, Bio-PVC, PET-G (i.e., Polyester) or any other type of "Eco Plastic" that meets the required specifications. The card (400) can be used in any conventional application where plastic cards are used today. While the may cause the card (400) to show slightly worse decomposing characteristics, compared to a card without the thin-film overlay (406), the card (400) is still significantly more environmentally friendly compared to conventional plastic cards that are used today.

In some embodiments, to further improve the mechanical properties of the card, the laminated wood substrate (402) and backers (404) can be flexed in a flexer prior to applying the thin-film plastic layer (406). The flexing causes the fibers in the wood substrate (402) to break. This gives the wood substrate (402) more flexibility along the grain direction. As a result, any issues of brittleness are reduced and the durability of the card (400) is increased. The combination of wood substrate (402), laminated cellulose backers (404), flexing process and thin-film overlay (406) results in a card (400) having a strength and flexibility that is comparable to conventional cards made of PVC or similar materials conforming to applicable ISO standards and norms.

An optional magnet strip can also be affixed to the back of the card (400) and various types of prints, such as text, indicia, bar codes, and so on, can be added to the front and/or back of the card (400) to give the card a unique and/or esthetically pleasing appearance. In some embodiments, an optional smartchip or RFID transmitter can be placed between the main substrate (402) and the cellulose backer (404). The smartchip or RFID transmitter can be in addition to or replace the magnet strip as an information carrier.

Figure 5:
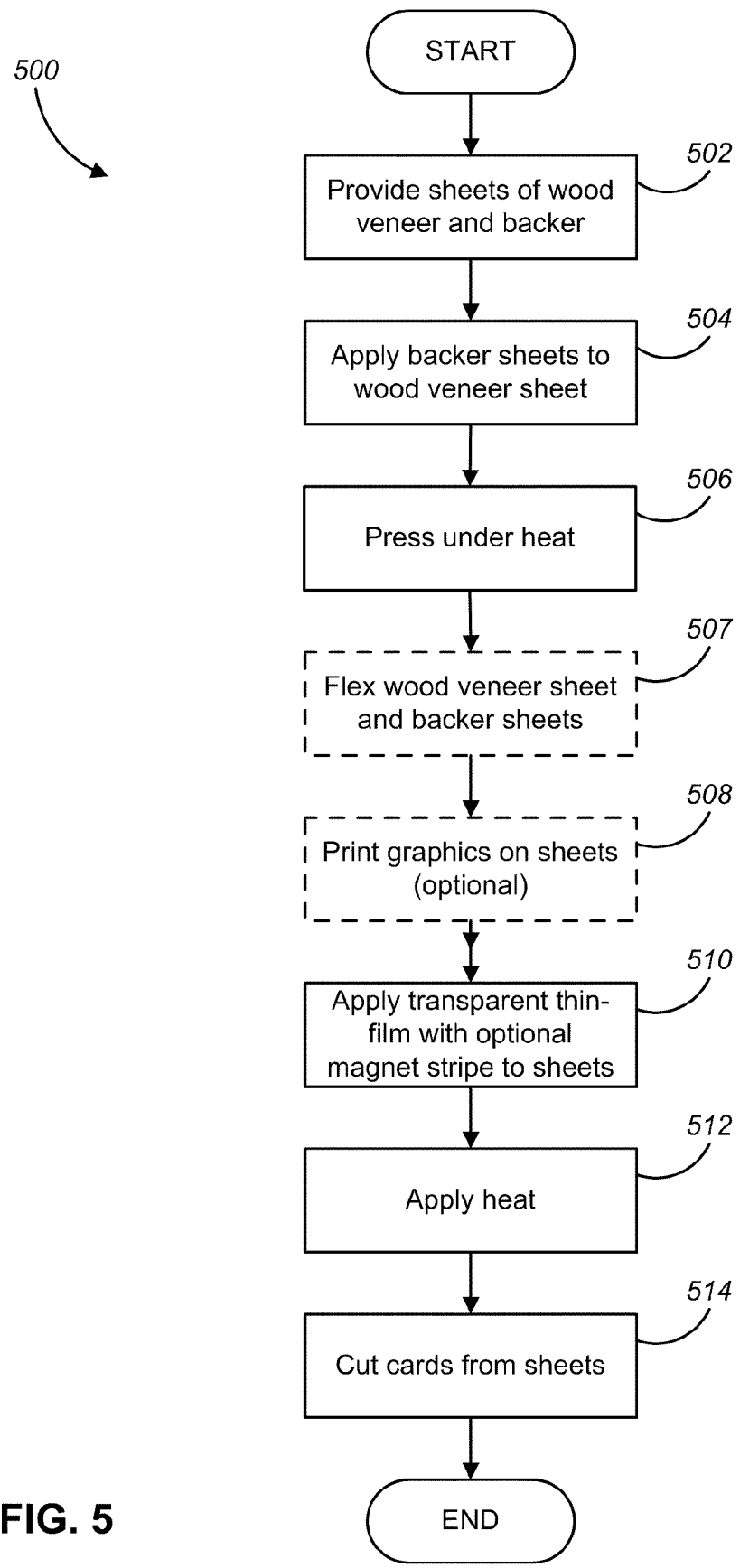
FIG. 5 shows a process for manufacturing a hybrid card, in accordance with one embodiment of the invention.

FIG. 5 shows a process (500) for manufacturing a hybrid card (400), in accordance with one embodiment. As can be seen in FIG. 5, the process starts by providing one sheet of wood veneer (402) and two sheets of cellulose backer (404) (step 502). The sheet of the cellulose backer (404) that is to be adhered to the back of the card can optionally have a magnet strip or RFID transmitting device included onto the cellulose backer (404). This is typically referred to as the magnet strip or RFID transmitting device being flush mounted.

Next, the two sheets of cellulose backer (404) (with or without the RFID transmitting device and/or magnet strip incorporated) are applied to the wood veneer (402) (step 504). In one embodiment, the cellulose backers (404) have an adhesive on the side of the respective cellulose backers (404) that faces the wood veneer (402). After the cellulose backer sheets (404) have been applied, the wood veneer (402), the two cellulose backer sheets (404) and the wood veneer (402) are pressed together under heat (step 506). Typically the heat is in the range of approximately 100-150 degrees Celsius, and the pressure is in the range of approximately 10-30 kg/cm$^2$. The heat and pressure is typically applied for approximately 15-30 seconds, but all of these parameters can of course vary depending on one or more of the type of pressing device, adhesive, cellulose backer, veneer thickness and wood species that are being used in the process (500). This causes the adhesive on the cellulose backers (404) to melt, thus adhering the two sheets of cellulose backer (404) to the respective sides of the wood veneer (402).

Next, in some embodiments, an optional step 507 takes place, where the wood veneer sheet (402) with the adhered cellulose backers (404) are flexed in a flexer. The flexing causes the fibers in the wood veneer (402) to break, thereby giving the wood veneer greater flexibility properties in the direction of the wood grain, which may be appropriate for certain applications.

In another optional step, 508, graphics are printed on the sheets if so desired, using the techniques described above. In some embodiments, the printing can be done as a separate process on a thin film, for example, using the retransfer printing technique described above. The thin film can then be adhered to the cellulose backer (404) to provide graphics on the wood veneer from which the cards (400) will be cut out, as will be described below.

Following the (optional) printing, a thin-film overlay (406) is applied to each side of the sheets of wood and adhered backer (step 510). This facilitates, although it is not strictly necessary, giving the card (400) the properties needed to perform according to ISO and customer specifications. If the card (400) is to be equipped with a magnet strip, and no magnet strip was added to the cellulose backer (404), the magnet strip can instead be added as part of this step by melting the magnet strip into the thin-film (406) (i.e., flush mounted). The thin-film (406) can be made from many different substances, such as, PVC, Bio-PVC, PET-G (i.e., Polyester) PLA (Polyactic Acid) or any other type of substances that comply with required standards, as is well-known to those of ordinary skill in the art.

Next, heat is applied again (step 512), this time to cause the thin-film overlay (406) to melt and adhere to the cellulose backers (404) on either side of the wood veneer (402). This step is conducted in accordance with conventional manufacturing standards for plastic cards, which are well known to those of ordinary skill in the art.

Finally, cards (400) are cut from the sheets in their final geometrical shape (step 514), which ends the process (500). In the event no optional graphics was included onto the cards in step 508, printing of optional graphics can be done after all the card manufacturing process is completed, using so-called single printing or one-up a process well known to those of ordinary skill in the art. After the cards (400) have been cut out from the sheets, the cards (400) can be coded in conventional manner using the magnet strip, RFID transmitter, or some kind of barcode, to store account information, value information, personal information, key code information, and so on, as is well known to those of ordinary skill in the art.

A number of embodiments have been described. Nevertheless, it will be understood that various modifications may be made without departing from the spirit and scope of the invention. For example, while the card (400) has been described above in terms of a conventional rectangular card, such as a credit card, it should be realized that any geometrical shape or size that can be cut out from the sheets may be used. Furthermore, as the skilled person realizes, there are many other materials that have similar properties to the ones described above that can be used to substitute one or more of the layers of the cards (400). In some embodiments, for example, the thin-film overlay (406) can be replaced with a UV curing water-based or waterless lacquer. The wood veneer is not required to have the exact thickness that is required for the card at the outset of the card manufacturing. Instead, a thicker veneer can be used, which is subsequently planed down to the desired thickness prior to adding the backers (404) and thin-film overlay (406). The two sheets of backer (404) can be made of different materials that have different physical properties, which is also true for the two sheets of thin-film overlay (406).

Of course any type of conventional glue could also be used, but this would have adverse effects on the environmental impact. Likewise, of course, the wood does not have to be from a sustainably managed forest, but this would also have an adverse impact on the environment. Accordingly, other embodiments are within the scope of the following claims.

The invention claimed is:

1. A hybrid card comprising:
a core consisting of a single layer wood substrate;
a first layer of a substantially organic backer made from a long-fibrous cellulose material, the first layer being securely affixed to a first side of the core, the first layer being substantially transparent to render the structure of the core visible through the first layer of substantially organic backer;
a second layer of a substantially organic backer made from a long-fibrous cellulose material, the second layer being securely affixed to an opposite side of the core, the second layer being substantially transparent to render the structure of the core visible through the second layer of substantially organic backer;
a first layer of thin-film overlay that is attached to an outer surface of the first layer of backer; and
a second layer of thin-film overlay that is attached to an outer surface of the second layer of backer.

2. The hybrid card of claim 1, wherein the first layer of backer and the second layer of backer are made of a same material.

3. The hybrid card of claim 1, wherein the first layer of thin-film overlay and the second layer of thin-film overlay are made of a same material.

4. The hybrid card of claim 1, wherein the wood is selected from the group consisting of: birch, pine, ash, beech, spruce and aspen.

5. The hybrid card of claim 1, wherein the first and second layers of backer are affixed to the core by means of an adhesive pre-applied to the first and second layers of backer.

6. The hybrid card of claim 1, wherein the first and second layers of backer further comprise admixed synthetic fibers and a latex binder.

7. The hybrid card of claim 1, wherein a total thickness of the card is approximately 0.76 mm.

8. The hybrid card of claim 1, wherein the first and second layers of thin-film are made of a material selected from the group consisting of: Poly Vinyl Chloride, Bio-Poly Vinyl Chloride, Polythylene Terephthalate and Polyactic Acid.

9. The hybrid card of claim 1, further comprising an account identifier securely affixed to the card and linking the card to a financial account, the account identifier being machine readable by a point-of-sale terminal.

10. The hybrid card of claim 9, wherein the account identifier includes one or more of a bar code, a magnetic strip, a smartchip, and a radio frequency identification (RFID) device.

11. The hybrid card of claim 1, wherein the card includes indicia identifying the type and use of the card.

12. The hybrid card of claim 1, wherein the card is operable to be used as one or more of: a credit card, a debit card, a key card, a stored value card, a pre-paid card, a gift card, an access card, a membership card, a medical insurance card, a phone card, a badge, an identification card, and a business card.

13. The composite sheet of claim 1, wherein the first and second layers of backer further comprise admixed synthetic fibers and a latex binder.

14. The composite sheet of claim 1, wherein a total thickness of the composite sheet is approximately 0.76 mm.

15. The composite sheet of claim 1, wherein the first and second layers of thin-film are made of a material selected from the group consisting of: Poly Vinyl Chloride, Bio-Poly Vinyl Chloride, Polythylene Terephthalate and Polyactic Acid.

16. A method for making a hybrid card, comprising:
providing a single planar sheet of a wood substrate to form a core of the hybrid card;
affixing a first sheet of substantially organic backer to a first side of the core, the first sheet being made from a long-fibrous cellulose material, the first sheet being substantially transparent to render the structure of the core visible through the first sheet of substantially organic backer;
affixing a second sheet of substantially organic backer to a second side of the core, opposite to the first side, the second sheet being made from a long-fibrous cellulose material, the first sheet being substantially transparent to render the structure of the core visible through the second sheet of substantially organic backer;
applying a first thin-film overlay to the first sheet of backer;
applying a second thin-film overlay to the second sheet of backer, whereby the organic core, the first and second sheets of substantially organic backer, and the first and second thin-film overlays form a sheet assembly; and
cutting one or more cards from the sheet assembly.

17. The method of claim 16, wherein affixing the first sheet and affixing the second sheet to the core includes:
applying an adhesive to one or more of the first sheet of backer, the second sheet of backer, and the core;
placing the first sheet of backer on the first side of the core and the second sheet of backer on the second side of the core; and
applying heat and pressure to the first sheet of backer, the second sheet of backer, and the core to cause the adhesive to form a bond between the core and the first and second sheets of backer.

18. The method of claim 17, wherein the heat is in the range of approximately 100 to 150 degrees Celsius, and wherein the pressure is in the range of approximately 10 to 30 kg/cm².

19. The method of claim 16, wherein the first and second sheets of backer further include a combination of synthetic fibers and a latex binder.

20. The method of claim 16, further comprising adding one or more of a bar code, a magnetic strip, a smartchip, and a radio frequency identification (RFID) device to the card.

21. The method of claim 16, further comprising printing one or more of text and indicia on the card.

22. The method of claim 16, further comprising:
flexing the core and affixed first and second backers prior to applying the first and second layers of thin-film.

23. The method of claim 16, wherein the first and second thin-film overlays are made of a material selected from the group consisting of: Poly Vinyl Chloride, Bio-Poly Vinyl Chloride, Polythylene Terephthalate and Polyactic Acid.

24. A decomposable composite sheet comprising:
a core consisting of a single layer wood substrate;
a first layer of a substantially organic backer made from a long-fibrous cellulose material, the first layer being securely affixed to a first side of the core, the first layer being substantially transparent to render the structure of the core visible through the first layer of substantially organic backer;
a second layer of a substantially organic backer made from a long-fibrous cellulose material, the second layer being securely affixed to an opposite side of the core, the second layer being substantially transparent to render the structure of the core visible through the second layer of substantially organic backer;
a first layer of thin-film overlay that is attached to an outer surface of the first layer of backer; and
a second layer of thin-film overlay that is attached to an outer surface of the second layer of backer.

25. The composite sheet of claim 24, wherein the wood is selected from the group consisting of: birch, pine, ash, beech, spruce and aspen.

26. The composite sheet of claim 24, wherein the first and second layers of backer are affixed to the core by means of an adhesive pre-applied to the first and second layers of backer.

27. A method for making a decomposable composite sheet, comprising:
providing a single planar sheet of a wood substrate to form a core of the decomposable composite sheet;
affixing a first sheet of substantially organic backer to a first side of the core, the first sheet being made from a long-fibrous cellulose material, the first sheet being substantially transparent to render the structure of the core visible through the first sheet of substantially organic backer;
affixing a second sheet of substantially organic backer to a second side of the core, opposite to the first side, the second sheet being made from a long-fibrous cellulose material, the first sheet being substantially transparent to render the structure of the core visible through the second sheet of substantially organic backer;
applying a first thin-film overlay to the first sheet of backer; and
applying a second thin-film overlay to the second sheet of backer, whereby the organic core, the first and second sheets of substantially organic backer, and the first and second thin-film overlays form a sheet assembly.

28. The method of claim 27, wherein affixing the first sheet and affixing the second sheet to the core includes:
applying an adhesive to one or more of the first sheet of backer, the second sheet of backer, and the core;
placing the first sheet of backer on the first side of the core and the second sheet of backer on the second side of the core; and
applying heat and pressure to the first sheet of backer, the second sheet of backer, and the core to cause the adhesive to form a bond between the core and the first and second sheets of backer.

29. The method of claim 28, wherein the heat is in the range of approximately 100 to 150 degrees Celsius, and wherein the pressure is in the range of approximately 10 to 30 kg/cm².

30. The method of claim 27, wherein the first and second sheets of backer further include a combination of synthetic fibers and a latex binder.

31. The method of claim 27, further comprising adding one or more of a bar code, a magnetic strip, a smartchip, and a radio frequency identification (RFID) device to the composite sheet.

32. The method of claim 27, further comprising printing one or more of text and indicia on the composite sheet.

33. The method of claim 27, further comprising:
flexing the core and affixed first and second backers prior to applying the first and second layers of thin-film.

34. The method of claim 27, wherein the first and second thin-film overlays are made of a material selected from the group consisting of: Poly Vinyl Chloride, Bio-Poly Vinyl Chloride, Polythylene Terephthalate and Polyactic Acid.

* * * * *